March 28, 1967 L. W. AIKEN ET AL 3,311,739

ACCUMULATIVE MULTIPLIER

Filed Jan. 10, 1963 11 Sheets-Sheet 1

INVENTORS
LAWRENCE W. AIKEN
ARTHUR SCHIFF
BY Joseph J. Connerton
ATTORNEY

March 28, 1967 L. W. AIKEN ET AL 3,311,739

ACCUMULATIVE MULTIPLIER

Filed Jan. 10, 1963 11 Sheets-Sheet 6

March 28, 1967 L. W. AIKEN ET AL 3,311,739

ACCUMULATIVE MULTIPLIER

Filed Jan. 10, 1963 11 Sheets-Sheet 10

March 28, 1967 L. W. AIKEN ET AL 3,311,739

ACCUMULATIVE MULTIPLIER

Filed Jan. 10, 1963 11 Sheets-Sheet 11

3,311,739
ACCUMULATIVE MULTIPLIER

Lawrence W. Aiken, Mount Marion, and Arthur Schiff, Lake Katrine, N.Y., assignors to International Business Machines Corporation, New York, N.Y., a corporation of New York Filed Jan. 10, 1963, Ser. No. 250,703
15 Claims. (Cl. 235—164)

The present invention relates to data processing systems and more particularly to an arithmetic element for use in such systems.

The speed at which certain calculations are performed in many computing devices may be of paramount importance, but in general speed increases must be weighed against the equipment necessary to achieve the desired performance.

In certain data processing applications, as for example operations involving matrices, differential equations, factor analysis and the generation of elementary functions, one of the repetitive type of operation encountered is that of accumulative multiplication, either single or double precision, i.e., the accumulation of a plurality of products according to the formula $A_1B_1+A_2B_2 \ldots +A_nB_n$ where A and B represent pairs of operands, the products of which are to be accumulated. Prior solutions to this type problem include complex program routines or in the case of double precision multiplication double precision adders. The former solution is time consuming, involves numerous instructions as the data is manipulated in single and double precision form and ultimately combined according to the above formula. Also, a substantial amount of memory space is required as data is transferred to and from memory. Since an adder in general represents the most expensive element in a data processing device, the double precision adder solution has a practical limitation due to the amount of additional circuitry with its resultant cost and power dissipation. Thus, it is desirable to effect a logical solution for accumulative multiplication utilizing single precision equipment and adapted to provide a high speed solution to the problem at nominal cost.

Accordingly, the present invention is directed to an accumulative multiplier adapted to provide high speed operation with a nominal increase in equipment over conventional single precision multipliers. The invention is adapted to generate the sum of two products by simultaneously accumulating partial sums while one of the products is being generated. The preferred embodiment, as shown and described, comprises a multiplier with associated registers, an additional single precision register and a nominal amount of control circuitry. In operation, the initial products of the first pair of operands designated $A_1B_1$ is resolved and at the completion of the first multiply cycle is stored in the Accumulator and B Register, the more significant portion of the double precision product being stored in the Accumulator. This product is then transferred to the combined Accumulator Storage Register-Accumulator, and the next pair of operands $A_2B_2$ entered into their respective Registers. As the second product is developed in iterative steps in the Accumulator-B Register, it is automatically added to the first product in the combined Accumulator Storage Register-Accumulator and effectively shifted iteratively into the Accumulator-B Register such that upon completion of the second multiply operation the sum of the products $A_1B_1$ and $A_2B_2$ are stored in the Accumulator-B Register. Each multiplication cycle utilizes a half add technique based on decoding individual multiplier bits as they are shifted from the B Register. This operation may be repeated for as many operands as required in the operation involved. Operating speed is further increased by use of a carry save multiplier in the preferred embodiment.

A primary object of the present invention is to provide an improved accumulative multiplier.

Another object of the present invention is to provide a high speed accumulative double precision multiplier using single precision components and circuitry.

A further object of the present invention is to provide digital data apparatus for generating the sum of a plurality of products according to the formula $$A_1B_1+A_2B_2 \ldots +A_nB_n$$

Still another object of the present invention is to provide an accumulative double precision multiplier utilizing carry save multiplication.

The foregoing and other objects, features and advantages of the invention will be apparent from the following more particular description of preferred embodiments of the invention, as illustrated in the accompanying drawings.

Figure 1:
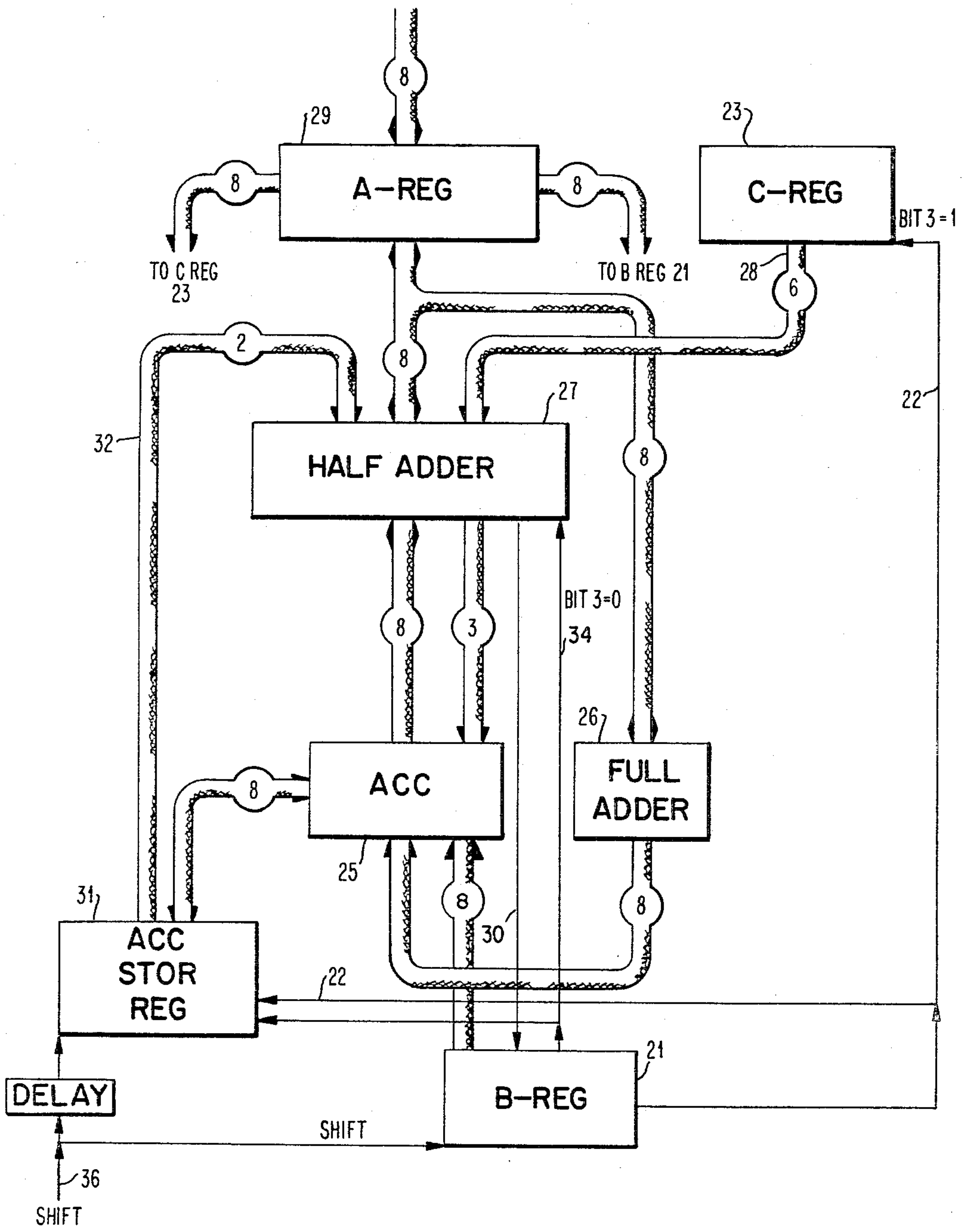
FIGURE 1 illustrates in block form a single or double precision multiplier arrangement according to this invention.

Referring now to the drawings and more particularly to FIGURE 1 thereof, the subject invention is illustrated in block form. For purpose of illustration, the multiplier is initially inserted into the B Register 21 and the multiplicand into the C Register 23 through any conventional data transfer means, and the resultant product will be stored in the combined Accumulator 25 and B Register 21. The present invention employs a half adder illustrated as block 27 for generating the half add sum of three variables, the third variable in the instant disclosure being the carries generated by the carry save half adder 27 for each partial product iteration, each such carry being stored in the A Register 29. While a carry save type of adder is illustrated and described in the preferred embodiment, it is to be understood that the principle of the invention is not limited to any specific type of adder. To simplify and clarify the description of the subject invention, the invention will be shown and described using words of 4 binary bits, the four bit words including a sign bit and three magnitude bits. However, it will be obvious to one skilled in the art that the invention can be readily expanded to any desired length merely by adding duplicate stages to those herein shown and described, and that in practice a system utilizing a considerably larger word length is contemplated. Further, in the ensuing description, either single or dual line transfer will be described, although for clarity a dual line transfer is assumed in the block arrangement of FIGURE 1. The present invention may be employed to provide an accumulative single or double precision product of two or more variables using a single precision adder. In the problem selected to illustrate the present invention, the double precision products used are derived from the product of two single precision numbers using a carry save adder. A carry propagate adder, shown as full adder 26, will be utilized in the final summation as more fully described hereinafter.

In the ensuing description, all registers contain a sign bit and data bits, the sign bit in the illustrated embodiment being 0 in the case of positive numbers and 1 in the case of negative numbers. However, in the multiplier arrangement employed in the preferred embodiment of the invention, the sign bit is checked and any negative numbers are changed to positive by complementing the number including the sign bit prior to multiplication. The negative sign indication is stored in a sign control flip-flop for subsequent modification of the sign of the product. In the preferred embodiment herein described, the A register performs a dual function; it serves as the common distribution center for incoming data and functions as the carry register of the carry save adder. The three data bits of the multiplicand in C Register 23 are examined simultaneously, their value being entered into corresponding positions of the half adder 27 through cable 28. As more fully described hereinafter, line 22 connects the positive or binary 1 output from the lowest order stage of the B Register 21 to the C Register 23. The multiplier in the B register 21 is examined on an individual bit basis commencing with the lowest order bit position. Whenever this bit is a 1, the contents of the C Register 23, the A Register 29 and Accumulator 25 are half added on an individual bit basis in the half adder 27; whenever the bit is a 0, only the corresponding bit position of the A Register and Accumulator are added in the half adder 27 while a zero is simulated for the third input. Irrespective of whether the low order bit of the B Register is a 1 or 0, the multiplier stored in B Register 21 is shifted one position to the right for each iteration, the shift pulse on line 36 also serving to sample the status of the low order bit of the B Register. When the B Register 21 is shifted one position to the right, the low order of the sum in the half adder 27 is transferred via line 30 to the high order position of the B Register, and this sequence is repeated for each iteration. The operation whereby the value of the third number represented by the contents of the C Register is simulated as a series of 0's is logically necessary since three values are required in the operation of a half adder. In the transfer from the C Register 23 to the half adder 27 as heretofore described, as well as in the simulation in the C Register when the low order B Register bit is a 0, as indicated by a pulse on line 34 the sign bit in the C Register is not transferred to the half adder since it is known to be a 0. Rather, the sign bit is provided to the half adder from the low order position of Accumulator storage register 31 by way of cable 32.

Throughout the following description and in the accompanying drawings there are certain conventions employed which are familiar to certain of those skilled in the art. Additional information concerning these conventions is as follows:

In the logical or block diagrams of the drawings a conventional arrowhead is employed to indicate: (1) a circuit connection, (2) energization with pulse signals and (3) the direction of pulse travel which is also the direction of control. A diamond-shaped arrowhead indicates: (1) a circuit connection, and (2) energization with a D.C. level. The input and output lines of the block symbols are connected to the most convenient side of the block for ease of illustration. A line entering a corner of a block symbol and emerging from the adjacent corner of a block symbol indicates that the pulses or D.C. levels are applied to the input of the circuit represented by the block and are simultaneously applied to additional circuits indicated by the line extension. In the description, a general arrangement of a preferred embodiment of this invention will be described with respect to the manner to which the various circuits, components and apparatus are interconnected as well as the general overall operation which is performed by these components and apparatus. The description of the general arrangements will be followed by separate and detailed descriptions of the various components and apparatus which so require it. To further illustrate the subject invention, the operation of the invention in solving an illustrative multiply operation will be described.

Referring now to FIGURES 2–10, prior to operation, it will be assumed that the A, B, C and Accumulator Storage Registers as well as the Accumulator have been cleared by their associated clear commands shown on the drawing. To initiate operation, the multiplicand is inserted into the A Register 29 from a memory source, not shown, by way of lines 41, 43, 45 and 47. As previously indicated, A Register 29 serves as the common distribution input from memory. Register stages 29*a* through 29*d* condition gate circuits 51–58 respectively, each stage conditioning a pair of associated gate circuits. A signal applied to line 61 labeled Xfer A Reg to C Reg samples gate circuits 52, 54, 56 and 58 and transfers their respective outputs by way of lines 62, 64, 66 and 68 and associated logical Or circuits to the input of C Register flip-flops 23*a*–23*d* such that the multiplicand is transferred to and stored in the C Register. The sign position of C Register 23, shown as flip-flop 23*a*, is examined by a pulse applied to line 71 labeled Make C Reg Pos. to determine whether the number in the C Register is positive or negative. Since the preferred embodiment of the invention, as heretofore noted, multiplies only positive numbers, any negative numbers must be complemented prior to multiplication. Since negative numbers are indicated by a "1" sign bit, assuming a negative multiplicand, the output from flip-flop 23*a* conditions gate circuit 73, which is sampled by the signal on line 71. The resultant output from gate circuit 73 is then applied by way of line 75, Or circuit 77 and line 79 to complement all stages including the sign position of the C register 23. In addiiton, the output from gate 73 on line 75 is applied to complement the sign control flip-flop 81 to the "1" state, the resultant output thereby conditioning gate circuits 83 and 85. At the same time that the sign position of the C register 23 is being examined and modified, if necessary, the A register 29 is cleared by applying a signal to line 87. The multiplier is next transferred from memory through the A register 29 by way of lines 41, 43, 45 and 47, the output from the A register conditioning associated pairs of gates 51–58 as heretofore described. Gate circuits 51, 53, 55 and 57, conditioned by corresponding stages 29*a* through 29*d* of the A Register 29, are simultaneously sampled by a signal on line 90 labeled Xfer A Reg to B Reg to transfer the contents of the A register 29 by way of lines 91, 93, 95 and 97 to corresponding positions 21*a*–21*d* of B register 21. While the described operation assumes cleared registers and single line transfer, it will be obvious that a dual line transfer could be utilized thereby obviating the need for clearing the registers before transfer. The sign position of the multiplier in B Register 21 is now examined to determine whether it is positive or negative. As with the C Register, if the sign bit indicates a negative number, the output on line 101 conditions gate circuit 103, which is then sampled by a signal on line 105 labeled Make B Reg Pos. The output from gate circuit 103 on line 107 is then applied through Or circuit 109 and line 111 to complement all stages including the sign bit of the B register by way of lines 111*a*–111*d*. The output from gate circuit 103 on line 107 is also applied to complement the sign control flip-flop 81 and thereby condition the appropriate output gates, the function of which is more fully described hereinafter. Simultaneously with checking and modifying the sign position of the B register in the manner above described, the A register 29 is cleared by a signal applied to line 87. With the multiplier now in the B register and the multiplicand in the C register, the operation of the subject invention relative to deriving the initial product AB of the multiplier and multiplicand in the B and C registers will now be described.

A signal applied to line 115 labeled Shift B Reg Rt. One samples gate circuits 121–126, 33 and 35 associated with the respective 1 and 0 outputs from individual stages of B register 21. The outputs of gate circuits 121–126 are interconnected to corresponding inputs of the adjacent stages such that each signal applied to line 115 produces a single position right shift of the B Register. For example, the output of gate 121 on line 131 associated with the 1 output from stage 21*a* is connected through Or circuit 133 to the 1 input of flip-flop 21*b*.

while the output of gate circuit 122 on line 132 associated with the 0 output of stage **21*a* is connected through Or circuit 135 to the 0 input of flip-flop 21*b***, and so forth.

Gate circuits 33 and 35, associated with the respective 1 and 0 outputs of flip-flop **21*d*, the low order position of B register 21, are likewise sampled by the shift pulse on line 115. If the low order stage 21*d* is a 1, the contents of the C register 23, the A register 29 and Accumulator 25 are half-added in half-adder 27 (FIG. 1); if the low order position is a 0, the A register 29 and the Accumulator 25 are half-added while a series of 0's are utilized to simulate the third input normally provided by C register 23. Assuming initially that stage 21*d* is in the 1 state, indicating that the contents of the C register 23 will be included in the half-add operation, the resultant output from gate circuit 33 on line 137, when sampled, is applied to sample gates 141–146, conditioned as shown by the outputs from the three low order stages of the C register, causing the contents of these C register stages to be gated into the half-adder. The output on line 137 is also applied through Or circuit 134 and line 151 to sample gate circuits 153 and 155 associated with the respective 1 and 0 outputs of the low order position 31*d* of accumulator storage register 31. Since the accumulator storage register has been previously cleared to the zero state by a signal applied to line 157, stage 31*d* is in the zero state and the resultant output from gate circuit 155 on line 159 effectively transfers the 0 value into the sign position of the half adder rather than utilizing the contents from the high order (sign) position of the C register 23**.

In the initial multiply operation, the input will be zero, but the contents of the low order position of Acc Storage Reg is required for subsequent double precision products and their accumulation. The accumulator storage register 31 is interconnected to the half-adder in this manner to permit the entry of a value from the accumulator storage register into the half add operation to obtain an accumulative double precision sum in a manner to be described hereinafter.

If the low order position **21*d* of the B register 21 is in the 0 state, the resultant output from gate circuit 35 on line 161 will be applied through logical Or circuits 163, 165 and 167 to effect the zero simulation of the C register previously noted. The output from gate circuit 35 is also applied through the previously described path of logical Or circuit 139 and line 151 to cause the contents of the low order position 31*d*** of the accumulator storage register to be entered into the high order position of the half adder as above described. The accumulator storage register will be shifted right one position following each multiply iteration, in a manner identical to that of the B register, to effect insertion of successive digits into the half-adder.

Figure 2:
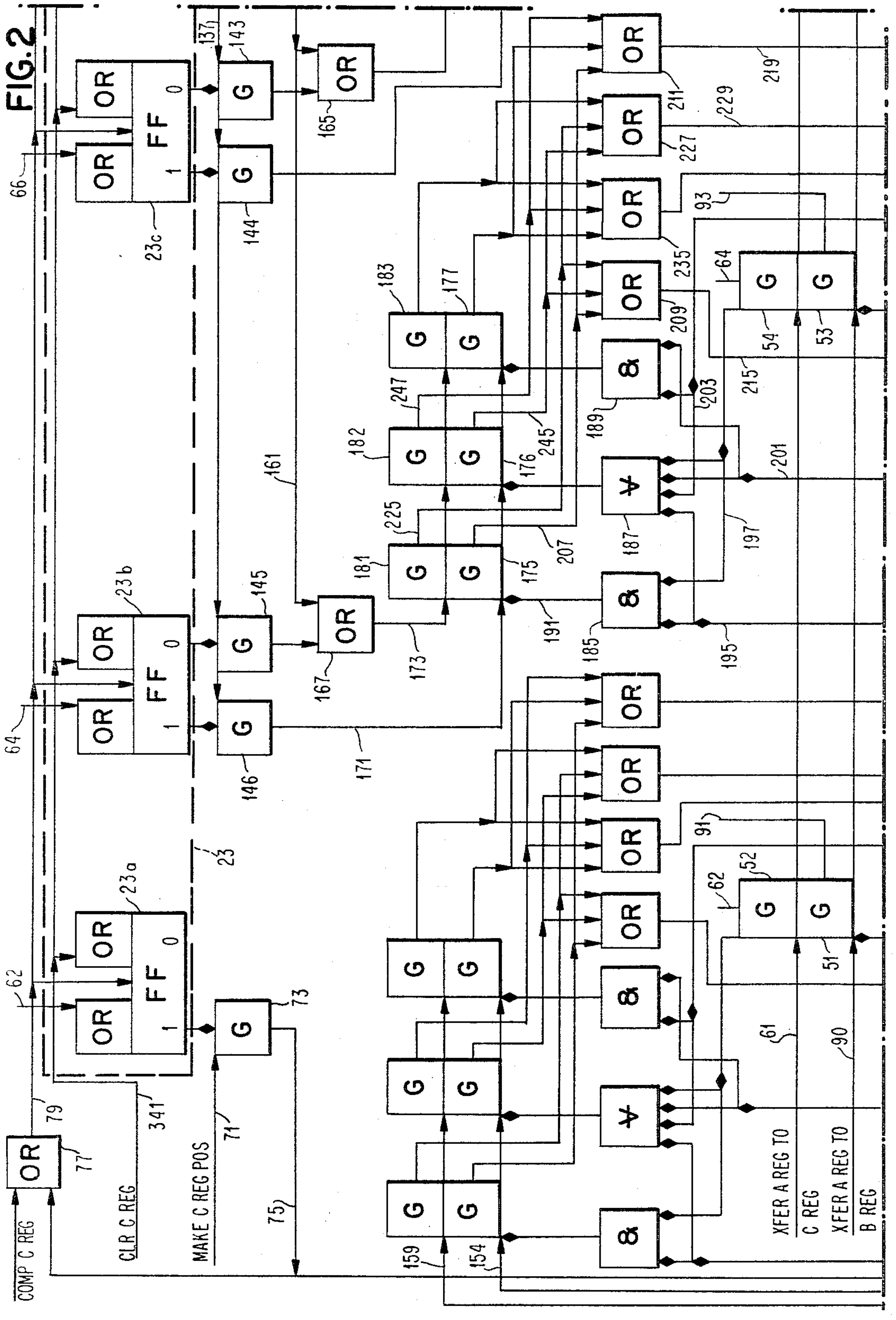
FIGURES 2–10 illustrate in detail the logic circuits of the multiplier arrangement shown in FIGURE 1.
Figure 3:
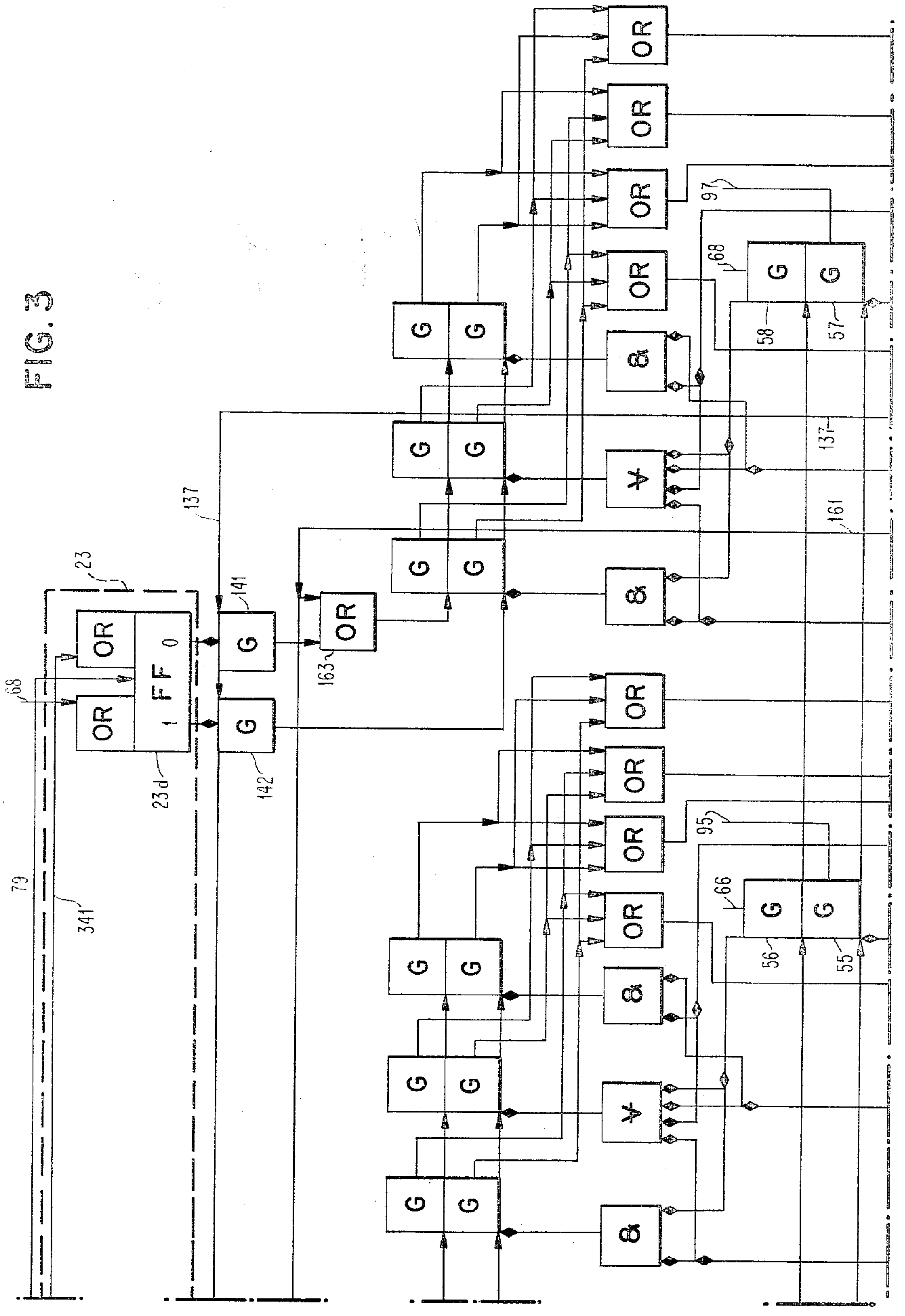
Figure 4:
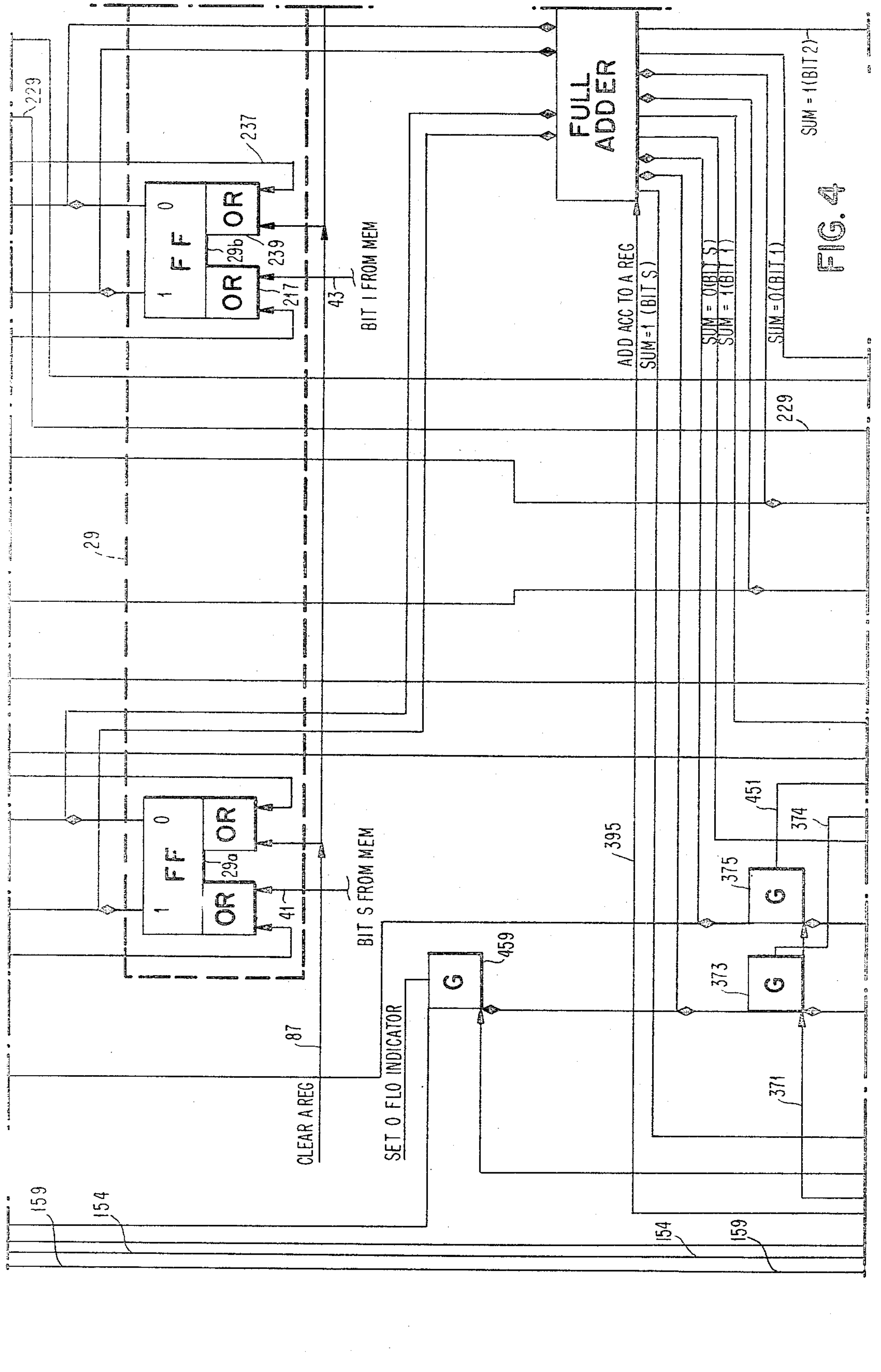
Figure 5:
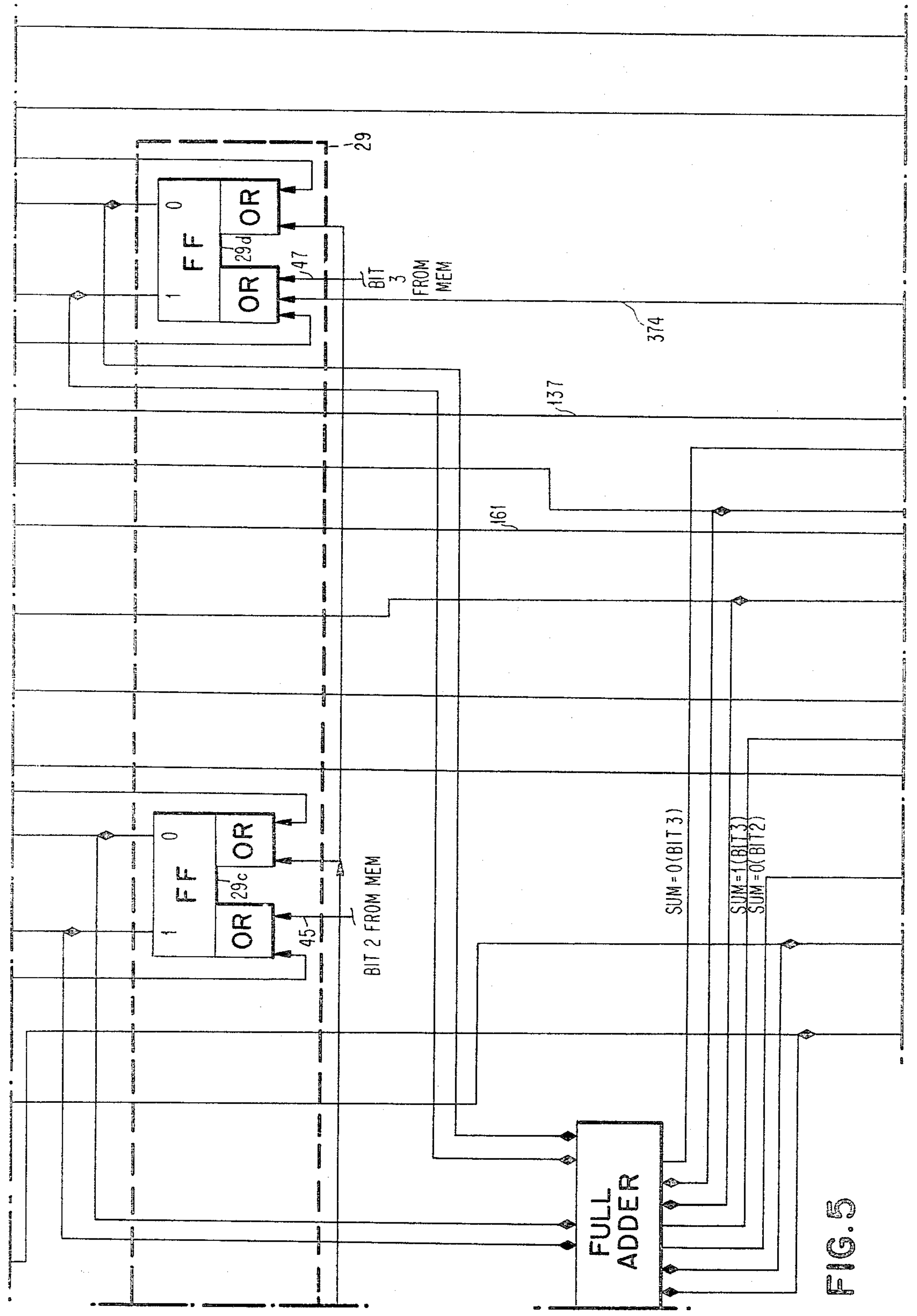
Figure 6:
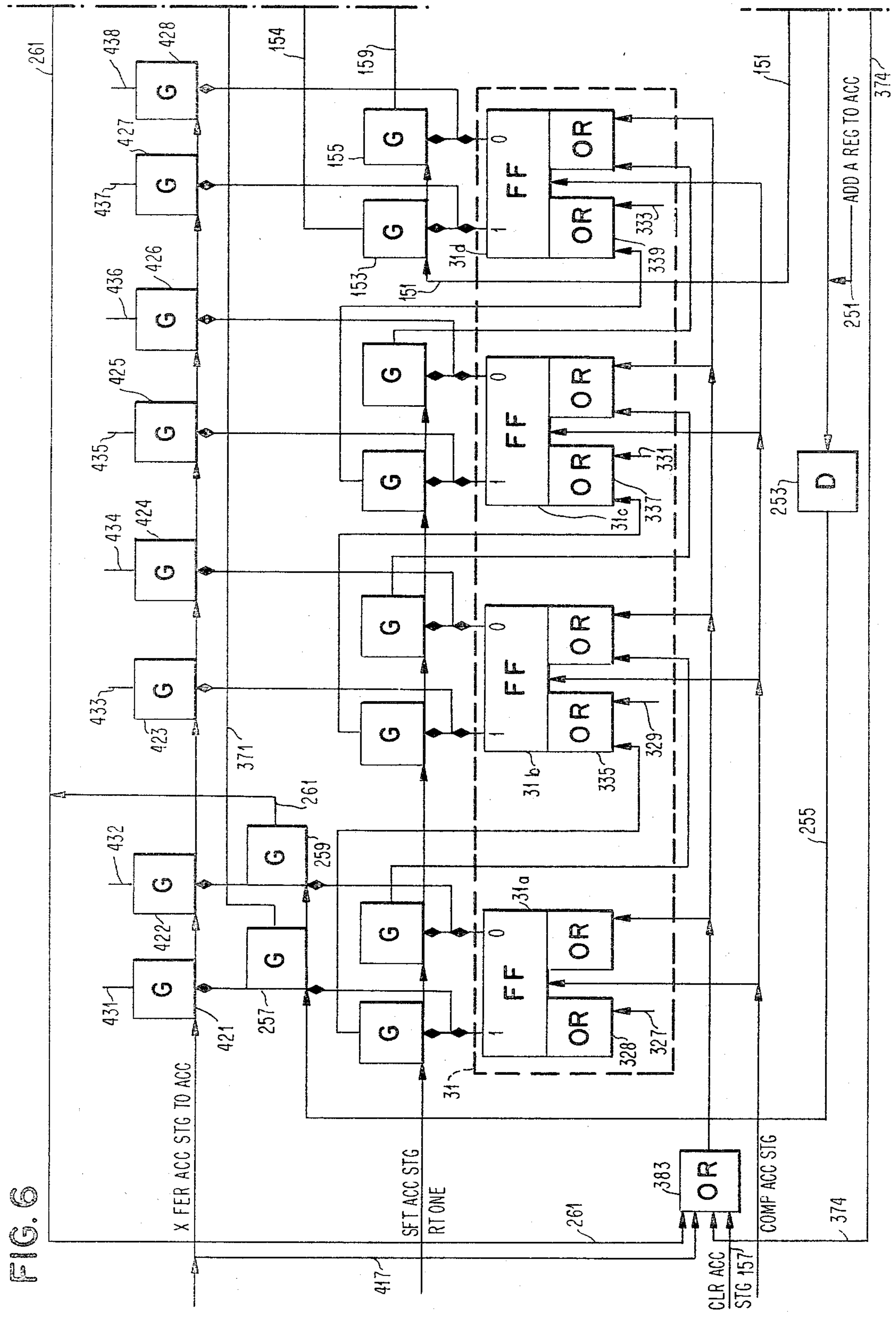

The operation of the half adder employed in the preferred embodiment of the present invention will now be described in detail, reference being made to FIGURES 2 and 3. Since the stages of the half adder and their operation are identical a detailed description of one stage will suffice for an understanding of all. Referring now to the details of the half adder utilized in the preferred embodiment, it functions to provide sum modulo 2 of the contents of the corresponding bit positions of the addend (multiplicand) stored in C register 23, the augend (partial product) stored in the Accumulator 25 and the carries stored in the A register 29. Considering the half adder stage for bit position 1 as illustrative of the remaining stages for purposes of description, the multiplicand input from C register 23 will be applied from gates 146 or 145 by way of lines 171 or 173 to sample gates 175 through 177 or 181 through 183 respectively. These gates in turn are conditioned by the output from logical And circuit 185, Exclusive Or circuit 187 and logical And circuit 189. The first input to logical And circuit 185 is provided via line 195 from the one output from the corresponding stage of accumulator 25 which contains the corresponding partial product bit, while the second input to logical And circuit 185 is provided from the 1 output of the corresponding stage of the A register 29 by way of line 197, this input on line 197 also being applied to Exclusive Or circuit 187. Thus, an output from And circuit 185 on line 191 will indicate the 1–1 condition of the corresponding stage of the A register and Accumulator. The first input to logical And circuit 189 is provided from the 0 output of the corresponding stage of the Accumulator 25 by way of line 201, this input also being applied to Exclusive Or circuit 187. The second input to logical And circuit 189, also connected to Exclusive Or circuit 187, is provided from the 0 output of the corresponding stage **29*b* of the A Register by way of line 203 such that an output from logical And circuit 189 indicates the 0–0 condition of the corresponding stages of the Accumulator and A register. Both the 1 and 0 outputs from the corresponding Accumulator and A register stages are applied as inputs to Exclusive Or circuit 187 such that an output from Exclusive Or circuit 187 defines either the 0–1 or 1–0 conditions of the corresponding Accumulator and A register stages. Since only one of the above conditions can exist, it will be apparent that one and only one set of gates 175, 181; 176, 182; 177, 183 will be conditioned by the output from logical And circuits 185, 189 and Exclusive Or circuit 187**. To clarify the operation of the half adder, its operation under the four possible conditions will be described.

Assuming the 1–1 condition of the Accumulator and A register stages, half add **25*b* and 29*b*, a carry of 1 will necessarily result from an addition, while the final sum will depend on the state of the third variable in the corresponding stage of the C register 23. Assuming the C register stage 23*b* is in the one state, gate circuit 175, conditioned by the output from logical And circuit 185, will be sampled by the output from gate circuit 146 when it in turn is sampled by the one output from B Register stage 21*d* (FIG. 10) via line 137. The resultant output on line 207 will be applied to logical Or circuits 209 and 211. The output from logical Or circuit 209, in turn, is applied via line 215 and logical Or circuit 217 to the one input of A Register stage 29*b*, indicating a carry of 1 in the half add operation. The output from logical Or circuit 211 is applied by way of line 219 and Or circuit 221 to the one input of the next lower stage 25*c*** of the accumulator, indicating a sum of 1 in the half add operation. Thus, for the above-described sequence, a sum 1 and carry 1 are generated with the sum automatically shifted one position to the right in the accumulator.

Assuming under the 1–1 condition of the Accumulator and A Register that the C register stage **23*b* is a 0, gate circuit 145 is conditioned and the resultant output is applied through logical Or circuit 167 and line 173 to sample gate circuits 181–183. Since gate circuit 181 is conditioned by the output from logical And circuit 185, the resultant output on line 225 is applied to logical Or circuits 209 and 227. The output from logical Or circuit 209, as previously described, indicates a carry of 1 from the half add operation. The output from logical Or circuit 227 is applied by way of line 229 and Or circuit 231 to the zero input of Accumulator stage 25*c***, thereby setting this stage in the 0 state and indicating a half-add sum of zero. Thus, the above-described half add sequence generates a sum of 0 and a carry of 1, the sum being automatically shifted one position to the right in the Accumulator.

Assuming the 0–0 condition of the Accumulator and A Register indicated by an output from logical And circuit 189, the carry will be zero irrespective of the state of the C Register stage **23*b*, while the sum will correspond to the state of the C register position 23*b***. If the C register stage 23*b* is in the one state, the resultant output from the gate circuit 146 on line 171 will function as above described to set accumulator stage 25*c* in the one state, and set stage 29*b* of the A register in the 0 state. If the C register stage 23*b* is a zero, the resultant output as above described will set the Accumulator position 25*c* and the A register position 29*b* in the 0 state, indicating a half-add sum and carry of 0. Under either a 0–1 or 1–0 condition of A Register stage 29*b* and Accumulator stage 25*b*, an output will be provided from Exclusive Or circuit 187 to condition gate circuits 176 and 182. Under either of these conditions, if the C register position 23*b* contains a 1, the resultant output on line 171 will sample gate circuit 176 and provide an output on line 245 which is applied to logical Or circuits 209 and 227. The output from logical Or circuit 209, as above described, will set the A register stages 29*b* in the one state, while the output from logical Or circuit 227 will set Accumulator stage 25*c* in the zero state indicating a half-add sum of zero. If the output from C register stage 23*b* is a 0, the resultant output on conductor 173 will sample gate circuit 182 to provide a signal on line 247 as an input to logical Or circuits 235 and 211. The output from logical Or circuit 235, in turn, is applied by way of line 237 and logical Or circuit 239 to set A register stage 29*b* in the zero state, while the output from logical Or circuit 211, as heretofore described, sets Accumulator stage 25*c* in the one state.

Thus, from the above description, it will be evident that for any binary combination of A register and Accumulator bits, one and only one set of gates will be conditioned, and the gate of the selected pair associated with the bit set in the C register will be sampled to provide the correct half-add output with respect to sum and carry. The four stages of the carry save adder are substantially identical in structure and operation to the above described stage except that the sum output from the lowest order stage of the half adder is applied to position 21*b* of the B register rather than being applied to the Accumulator. The sign position of the B register 21 will remain in the zero state throughout the iterative multiplication. At the end of the multiplication process, the sign position will conform to the sign of the entire word which will be stored in the sign position 25*a* of accumulator 25. The above defined process will be repeated for each multiplier bit until the entire word has been multiplied.

Figure 7:
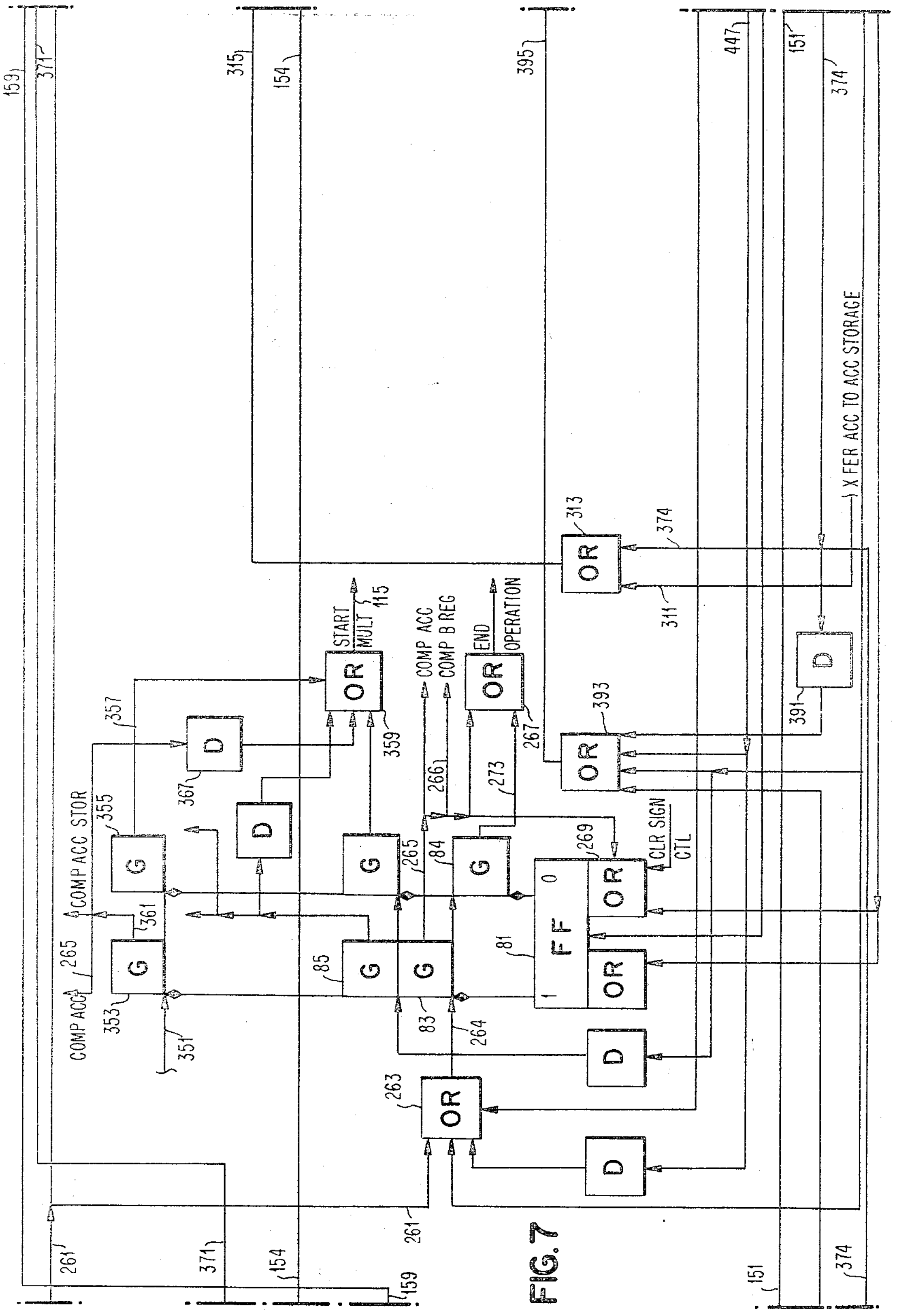
Figure 8:
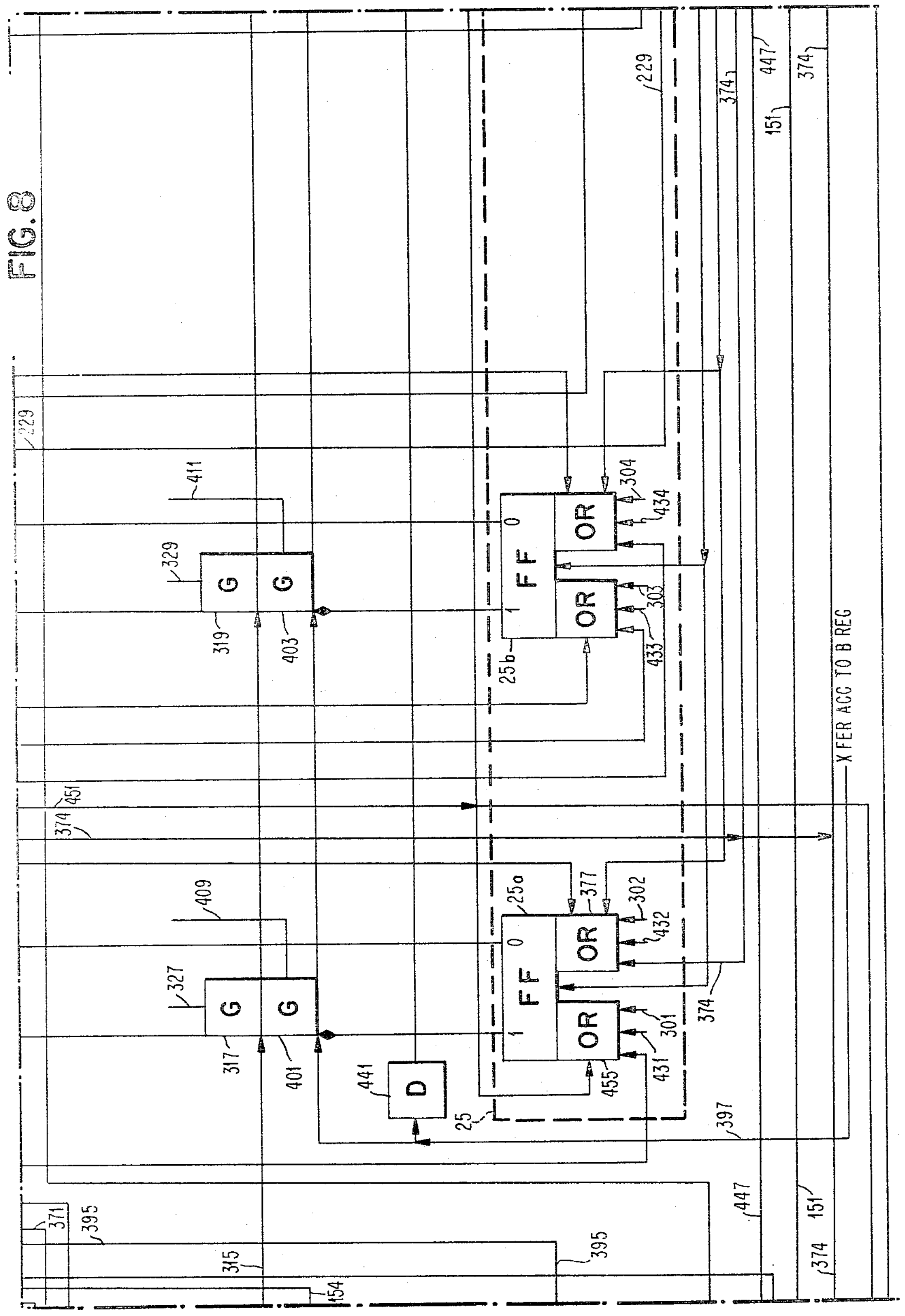
Figure 9:
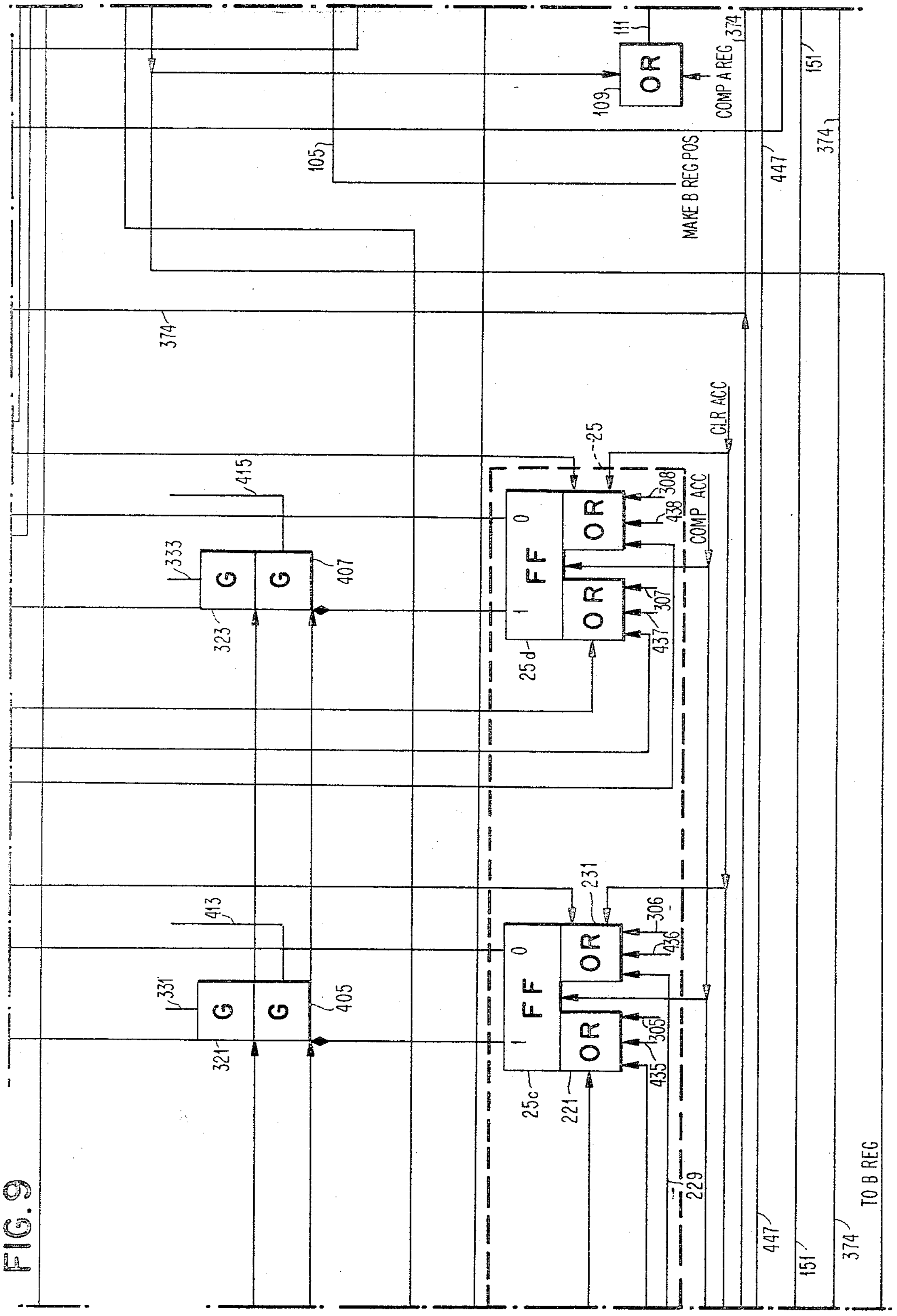
Figure 10:
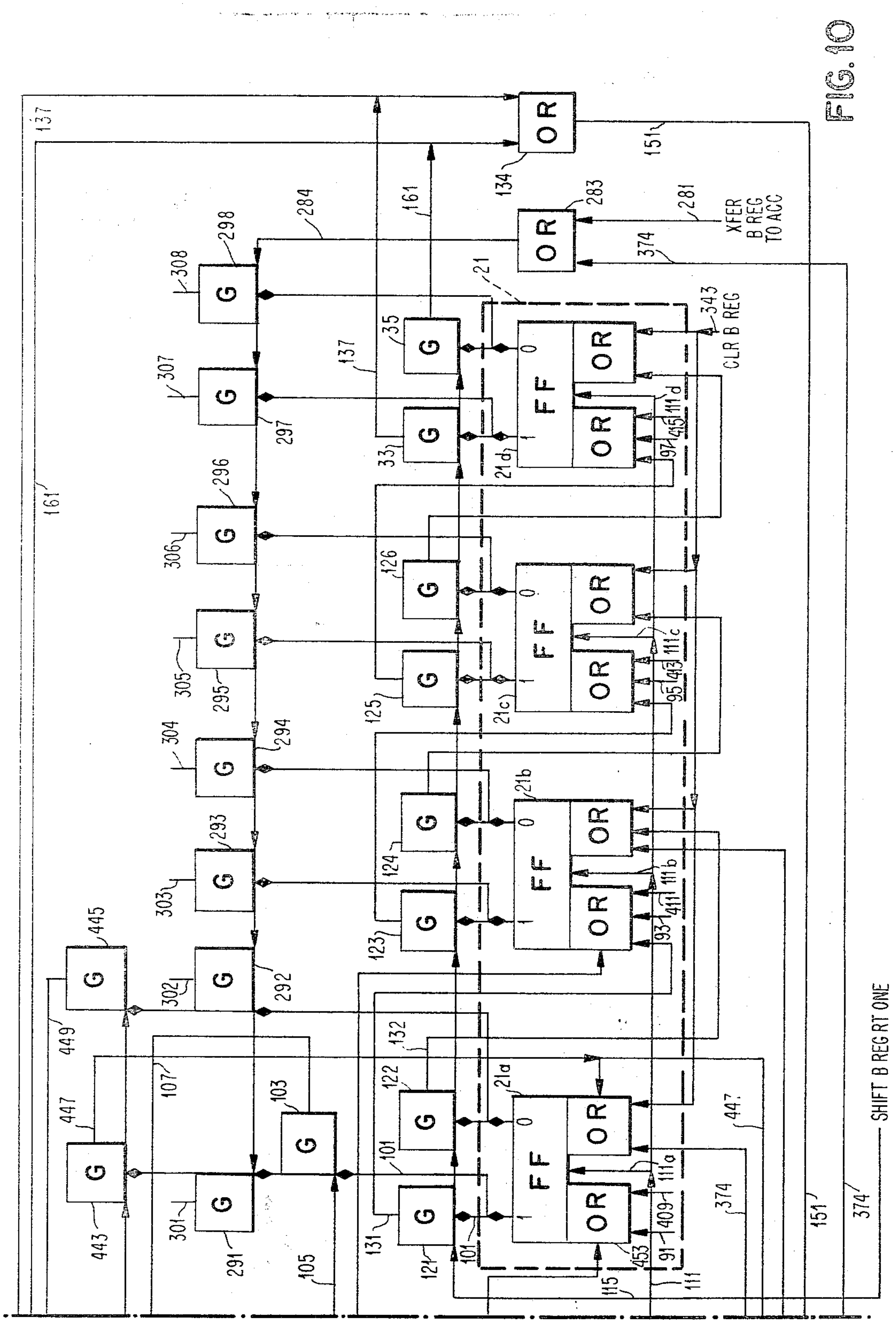
Figure 11:
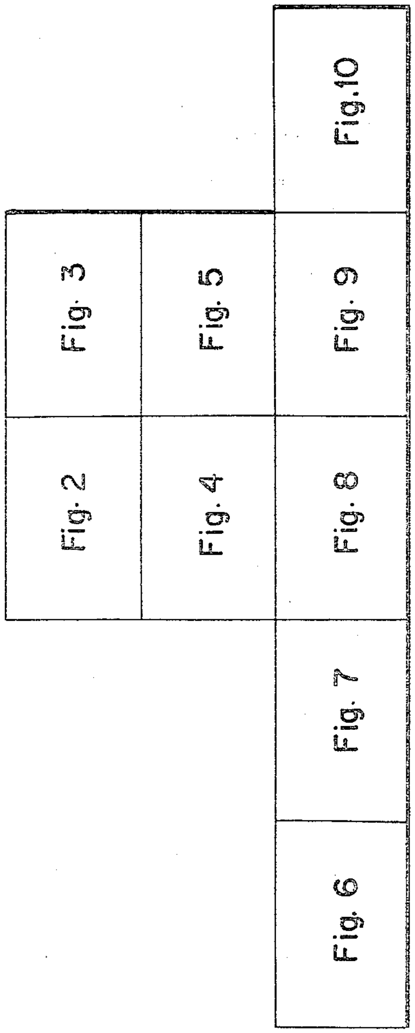
FIGURE 11 illustrates the relative arrangement of FIGURES 2–10 with respect to one another.

Prior to transferring the double-precision product from the Accumulator-B register to the Accumulator Storage-Accumulator, the signal on line 251 is applied directly through Or circuit 393 and line 395 to the full adder to add the carries in the A register to the final partial product in the Accumulator. The sign of the product will be checked by applying a signal to line 251 (FIG. 6) through delay unit 253 and line 255 to sample gate circuits 257 and 259. Since gate circuits 257 and 259 are conditioned by the 1 and 0 outputs respectively of stage 31*a* of Accumulator-Storage 31, and since this state was initially cleared to the 0 condition by a signal applied to line 157, an output will be provided on line 261 which in turn is applied through logical Or circuit 263 to sample gate circuits 83 and 84 associated with the 1 and 0 outputs from sign control flip-flop 81 (FIG. 7). If the sign of the product is negative, the sign control flip-flop 81 will be in the one state, thereby conditioning gate circuit 83. The resultant output from gate circuit 83 on line 265, when sampled, will be applied to complement all stages of the Accumulator (and will also be applied by way of line 266 to complement all stages of the B register). An output labeled End Operation is also provided through logical Or circuit 267 to indicate the end of the multiplication process and finally is applied through logical Or circuit 269 to reset the sign control flip-flop in the zero state. If the sign of the product is positive, sign control flip-flop 81 would be in the zero state, thereby conditioning gate 84 circuit which, when sampled by a signal on line 264, would provide an output on line 273. Since no correction of the sign is required, the output will be applied through logical Or circuit 267 to indicate the end of the multiply operation.

Following the sign determination of the product, the contents of the combined Accumulator-B register will now be transferred to the combined Acc. Storage Register-Accumulator. The commands to transfer the B register to the Accumulator and transfer the Accumulator to the Accumulator-Storage are generated simultaneously. However, the accumulator must be transferred into the Accumulator Storage Register first and if necessary conventional delay techniques could be employed to execute this sequence. The transfer B Register to Accumulator command is generated on line 281 and applied through logical Or circuit 283 to sample via line 284 gate circuits 291–298 which are selectively conditioned by the binary outputs from the associated B Register stages 21*a* through 21*d*. Depending on the state of the individual register stages, output signals from gate circuits 291–298 will be generated on lines 301–308 respectively, which are then applied to the corresponding inputs 301–308 of Accumulator 25. For the sake of clarity, the specific interconnections are not illustrated but are identified by corresponding subscripts.

As previously described, immediately prior to the B register to Accumulator transfer, the transfer from the Accumulator to the Accumulator Storage Register takes place. This transfer is initiated by a signal applied to line 311 labeled XFER Accumulator to Acc.-Storage through Or circuit 313 and line 315 to sample gate circuits 317, 319, 321 and 323 which are conditioned by the respective binary one outputs from the associated Accumulator stages 25*a*, 25*b*, 25*c* and 25*d* respectively. Since the Accumulator Storage Register is initially in a cleared or zero condition, it is only necessary to transfer the 1's from the Accumulator to the Accumulator-Storage to effect a complete transfer. The output from gate circuit 317 on line 327 is applied to the binary 1 input of stage 31*a* of the Acc.-Storage Reg. through Or circuit 328. Likewise, the output on lines 329, 331 and 333 are applied to the binary 1 inputs of stages 31*b*, 31*c* and 31*d* of Acc.-Storage by way of Or circuits 335, 337 and 339 respectively. Again in the interest of clarity, the interconnections are not illustrated but are identified by subscripts. In this manner the first double length product is now stored in the combined Accumulator and Acc.-Storage.

Returning to the operation of the subject invention, the C Register 23 is cleared by a signal applied to line 341, the B Register 21 by a signal applied to line 343 and the second multiplicand and multiplier inserted into the C register 23 and the B Register 21 respectively for the next double precision multiplication process. The multiplication process will differ from that previously described in that the Accumulator rather than being initially cleared contains the low order portion of the first double precision product. Prior to multiplication, the sign of the multiplicand and multiplier in the C and B registers will be checked in the manner heretofore described to determine the sign of the product. If either term is negative, it will be complemented in the manner previously described and the indication of this sign will complement the sign control flip-flop 81. Prior to initiating the second multiply operation, a signal is applied to line 351 to sample gate circuits 353 and 355 which are conditioned by the respective 1 and 0 outputs of sign control trigger 81. Assuming the product will be positive, i.e., flip-flop 81 in the 0 state, the output from gate circuit 355 will be applied via line 357 through Or circuit 359 to generate a START MULTIPLY signal on line 115 which shifts the B Register one position to the right and initiates the multiply operation in the manner previously described. If the second product will be negative, gate circuit 353 will be conditioned by the binary 1 output of flip-flop 81, which when sampled by a signal on line 351, will generate a signal on line 361 to complement the Accumulator via line 265 and complement the Acc.-Storage directly. The output on line 361 is also applied through delay circuit 367 and Or circuit 359 to generate the start multiply signal on line 115, the delay 367 being of sufficient duration to permit the complementing operation to be completed prior to initiation of the multiplication process.

After the first iteration of the second double precision multiplication, the lowest order bit of the sum of the two double precision products will be stored in stage **21*b* of B Register 21. After three multiplication iterations, the lowest order bit of the accumulative double precision product will be stored in stage 21*d* while the next higher order bits will be stored in stages 21*b* and 21*c* respectively of the B register 21. When the multiplication is complete, the remaining three bits of the accumulative double precision product together with the sign but minus the carries will be stored in stages 25*a* to 25*d* of the Accumulator 25. The carries are stored in the carry save adder for the final summation by the full adder 26, which, as heretofore noted, is initiated by applying a signal to line 251 causing the contents of the A Register 29 to be added to the Accumulator 25** in the manner previously described such that the final high order bits of the accumulative double precision product are now stored in the Accumulator.

As previously described, if the signs of the two products are unlike, stage **31*a* of the Acc.-Storage Register would be in the 1 state. This condition could arise either by having the first double precision product negative and the second positive, in which case the sign bit in stage 31*a* would have remained negative, or the first product positive and the second negative, in which case the contents of the Acc.-Storage Register and Accumulator would have been complemented from positive to negative in the manner previously described. Under the latter condition, the one output from stage 31*a* conditions gate circuit 257, which is sampled by a delayed Add A Register to Accumulator signal on line 251. The resultant output on line 371 will sample gate circuits 373 and 375, which in turn are conditioned by the respective 1 and 0 outputs of accumulator stage 25*a***.

If the Accumulator sign position **25*a* is in the one state, gate circuit 373 is conditioned and when sampled as above indicated, the resultant output on line 374 will perform the following functions. First, the Acc. sign position 25*a* will be cleared or reset through logical Or circuit 377; second, the B Register sign position 21*a* will be cleared through logical Or circuit 381; third, the Acc.-Storage Register will be cleared by applying a signal through logical Or circuit 383; fourth, the signal on line 374 is applied through logical Or circuit 313 and line 315 to sample gate circuits 317, 319, 321 and 323, thereby causing the contents of the accumulator to be transferred to the Acc.-Storage register in the manner previously described; fifth, the signal is applied through logical Or circuit 283, the resultant output on line 284 samples gate circuits 291–298, thereby causing the contents of the B Register to be transferred into the Accumulator in the manner previously described. The signal is also applied by way of line 374 through logical Or circuit 387 to set low order bit 3 of the A Register in the one state, and finally, the output on line 374 is applied through delay unit 391 and logical Or circuit 393 to line 395**, causing the contents of the A Register to be added to the Accumulator.

Since the lowest order stage **29*d* of the A Register was set in the one state by the above described operation, the previous accumulative sum of the products was one less than its true value, and adding one to the lowest order position restores the accumulative sum to its correct value. Following this correction, the correct sum is transferred from the Accumulator Acc.-Storage to the B Register-Accumulator by applying a signal initially to line 397 to sample gates 401, 403, 405 and 407 and provide outputs on lines 409, 411, 413 and 415 whenever the associated Accumulator stages were in the one state. These outputs are then applied as inputs to corresponding positions in the B register such that the contents of the Accumulator are transferred to the B register. Simultaneously a signal is applied to line 417 (labeled XFER ACC. STOR to ACC.) to sample gate circuits 421–428 to provide outputs on lines 431–438 respectively. These outputs from the Acc.-Storage Register are then applied as inputs to corresponding positions in the Accumulator, as shown in the drawing, thus effectively causing the contents of the accumulator-storage to be transferred into the accumulator. The signal applied to line 417 is also applied through Or circuit 383 to reset the Acc.-Storage Register to the zero state. The Xfer Acc. to B Reg. signal applied to line 397 is also applied through delay unit 441 to sample gate circuits 443 and 445, which in turn are conditioned by the respective 1 and 0 outputs from the sign position 21*a* of the B register 21. Depending on whether stage 21*a* is in the 1 or 0 state, an output will be provided on lines 447 or 449 respectively, the output on line 447 being applied through logical Or circuit 381 to reset the sign position 21*a* to the zero state, the output on line 449 being applied through logical Or circuit 263 to sample gate circuits 83 and 84. If the sign is negative, i.e., sign control flip-flop 81 in the 1 state, it is restored to 0 by the output from gate circuit 83. The resultant output from gate circuit 83 or 84 when applied through logical Or circuit 267** indicates the end of the operation.

If the sign order position **21*a* of the B Register was in the 1 state, the resultant output on line 447 from gate circuit 443 would reset stage 21*a* to the zero state, and when applied through logical Or circuit 263 as above described, would indicate end of the operation. Prior to end of operation, however, the signal on line 447 is applied through logical Or circuit 393 and line 395 to the full adder 26 to add a one to the contents of the Accumulator in the high order portion of the final sum. If the sign position 25*a* of Accumulator 25 was in the zero state, the resultant output from gate circuit 375 on line 451 is applied through logical Or circuit 453 to set the sign position of the B register in the 1 state, and is also applied through Or circuit 455 to set the sign bit 25*a* of the accumulator in the 1 state. Finally, it is applied through logical Or circuit 263 to perform the sign restoration in the manner previously described and to indicate the end of the operation. Gate circuit 459, conditioned by the one output from accumulator stage 25*a***, is provided to indicate an overflow condition if the two sign conditions were in the one state or if the sign of the two products were the same.

To clarify the operation of the subject invention and in particular the operation of the control circuitry, a sample problem using operands of 4 binary bits, sign and 3 magnitude bits, will be described in tabular step form. Using the terms A and B to define the single precision operands, assume $A_1=3$, $B_1=3$, $A_2=3$, $B_2=5$. In binary notation, these factors appear as follows:

$A_1=0.011$
$A_2=0.011$
$B_1=0.011$
$B_2=0.101$

Using conventional binary arithmetic, the first product $A_1 B_1$ is 001 001. The second product $A_2 B_2$ is 001111, while the accumulative double precision product of $A_1B_1+A_2B_2$ is 011000. Table I below illustrates the sequence of operations in generating the accumulative double precision product.

TABLE I

| Operation | Acc-Stor Register | A Register | Accumulator | C Register | B Register |
|---|---|---|---|---|---|
| 1. Clear all registers | 0.000 | 0.000 | 0.000 | 0.000 | 0.000 |
| 2. Insert $A_1$ in C Reg, $B_1$ in B Reg | 0.000 | 0.000 | 0.000 | 0.011 | 0.011 |
| 3. Sense sign bit of $A_1$ $B_1$, if negative, complement number and sign control trigger. | | | | | |
| 4. Generate first double precision product | 0.000 | 0.000 | 0.001 | 0.000 | 0.001 |
| 5. Check sign control trigger for sign of product, if negative (one state), complement accumulator-B Reg and reset sign control trigger. | | | | | |
| 6. Transfer Acc to Acc Stor, B Reg to Acc | 0.001 | 0.000 | 0.001 | 0.000 | 0.000 |
| 7. Insert $A_2$ in C Reg, $B_2$ in B Reg | 0.001 | 0.000 | 0.001 | 0.011 | 0.101 |
| 8. Sense sign of $A_2$, $B_2$ and complement if negative. (Note step 3.) | | | | | |
| 9. Sense sign control trigger for sign of product. (If negative complement $A_1$ $B_1$ in Acc Stor Reg Acc.) | | | | | |
| 10. Shift B Reg right one position | 0.001 | 0.000 | 0.001 | 0.011 | 0. ( )10 |
| 11. Check bit 3 of B Reg (shifted out). (If 1, half add Acc, C Reg, A Reg, bit 3 of Acc Stor Reg.). | 0.001 | 0.001 | 1.010 | 0.011 | 0. (0)10 |
| 12. Transfer bit 3 of Acc to bit 1 B Reg | 0.001 | 0.001 | 1.010 | 0.011 | 0.010 |
| 13. Shift Acc-Acc Stor Reg right one | 0.000 | 0.001 | 0.101 | 0.011 | 0.010 |
| 14. Shift B Reg right one position | | | | | 0. ( )01 |
| 15. Check bit 3 of B Reg. (If 0, half add A Reg, Accumulator, bit 3 Acc Stor Reg and simulate 0's for C Reg.). | 0.000 | 0.001 | 0.100 | 0.011 | 0. ( )01 |
| 16. Transfer bit 3 of Acc to bit 1 B Reg | 0.000 | 0.001 | 0.100 | 0.011 | 0.001 |
| 17. Shift Acc Stor Reg-Acc right one | 0.000 | 0.001 | 0.010 | 0.011 | 0.001 |
| 18. Shift B Reg right one | 0.000 | 0.001 | 0.010 | 0.011 | 0. (0)00 |
| 19. Check bit 3 of B Reg, half add Acc, C Reg, A Reg, bit 3 of Acc Stor | 0.000 | 0.011 | 0.000 | 0.011 | 0. ( )00 |
| 20. Transfer bit 3 of Acc to bit 1 B Reg | 0.000 | 0.011 | 0.000 | 0.011 | 0.000 |
| 21. Shift Acc-Acc Stor right one | 0.000 | 0.011 | 0.000 | 0.011 | 0.000 |
| 22. Full add A Reg-Acc, sum in acc | 0.000 | 0.000 | 0.011 | 0.011 | 0.000 |
| 23. Clear A Reg, C Reg | 0.000 | 0.000 | 0.011 | 0.000 | 0.000 |
| 24. Determine sign of sum by checking sign control trigger and Acc Reg sign position. (If sign position acc stor reg 0,: | | | | | |
| a. If sign pos. acc stor reg 0, both products pos., answer in Acc and B Reg | | | 0.011 | | 0.000 |
| b. If sign pos acc stor reg 1, both products negative, complement Acc and B Reg) | | | | | |
| If sign position acc storage reg 1, sign of 2 products unlike, add 1 to bit 3 of B Reg | | | | | |

From Table I supra, the manner in which the relevant data is manipulated by the subject invention to provide an accumulative double precision product has been described in detail. Certain of the tabulated operations are necessitated by the one complement arithmetic utilized in the subject invention. As one specific example, in step 24, when the signs of the double precision product are unlike, a 1 is added to the low order position of the accumulative sum in the B Register to accomplish the carry required in the addition of numbers of unlike sign. The arithmetic philosophy employed by the subject invention is to perform a correct magnitude operation and determine the proper sign upon completion thereof. The problem selected to illustrate the operation of the subject invention utilized only positive operands in the interest of clarity, but the manner in which negative operands are employed is shown in Table I. Further, while only two sets of operands were utilized in the illustration, any additional number of double precision products could be accumulated by repeating steps 7 through 24 for each additional set of operands. While the carry save technique utilized in the subject invention provides high speed of operation by eliminating the carry propagation each iteration, the subject invention is equally applicable to any type adder. In operation, the control circuitry which controls the number of iterations has been omitted from the drawings in the interest of clarity, but a counter could be employed to indicate when the proper number of multiply iterations have been completed.

With respect to the logic circuits shown in block form in FIGURES 2 through 10, a variety of circuits for performing these functions is known in the art and any set of compatible circuits could be employed. An Exclusive Or circuit, which provides a somewhat more complex logical function, is shown in copending application Serial No. 745,391, now Patent No. 3,103,596 entitled, "Exclusive Or Circuit" filed by John W. Skerritt June 30, 1958. An adder circuit suitable for use in the present invention is shown in copending application Serial No. 155,773, now Patent No. 3,115,574 entitled, "High Speed Multiplier" filed by Gerard T. Paul et al. November 29, 1961.

From the preceding description the significant increase in speed afforded by the present invention in obtaining an accumulative product over known prior art methods will be apparent. For accumulating the single or double precision product of two sets of operands, only two multiply cycles are required; for three sets of operands, three multiply cycles and so forth. Further, the only additional hardware required for double precision operation over a conventional single precision multiplier is an additional shifting register and a nominal amount of additional control circuitry.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An accumulative double precision multiplier to provide the accumulative product of first and second sets of operands comprising in combination a plurality of registers,
   - an accumulator,
   - an adder connected to said accumulator,
   - means for entering said first set of operands into selected ones of said registers,
   - means for sensing the low order digit of a first of said operands to initiate a multiply iteration,
   - means responsive to sensing the remaining digits of said first operand sequentially for generating successive multiply iterations whereby a first double precision product is formulated during a first multiply cycle,
   - means for generating the double precision product of a said second set of operands during a second multiply cycle
   - and control means operative during the generation of said second double precision product to simultaneously combine the double precision product of said first set of operands with corresponding portions of the double precision product of said second set of operands during each iteration of said second multiply cycle.

2. An accumulative double precision multiplier to provide the accumulative double precision product of first and second sets of operands comprising in combination a plurality of registers,
   - an adder connected to one of said registers, means for entering said first set of operands into selected ones of said registers,
means for sensing the low order digit of a first of said operands,
means responsive to said sensing to initiate a multiply iteration,
each multiply iteration including a shift or an add and shift of said second operand in accordance with the value of said sensed digit,
means responsive to sensing the ermaining digits of said operand sequentially for generating successive multiproduct of said first set of operands is formulated during a first multiply cycle,
means for generating the double precision product of a second set of operands during a second multiply cycle,
and control means operative during said second multiply cycle of said second set of operands to simultaneously combine the product of said first set of operands with corresponding portions of said product of said second set of operands during each iteration of said second multiply cycle.

3. An accumulative double precision multiplier comprising a plurality of registers for storing a corresponding plurality of operands,
means including an adder and an accumulator circuit for generating the double precision product of a first set of operands,
said first double precision product being developed in one of said registers and said accumulator during a first multiply cycle,
the high order portion of said first double precision product being stored in said accumulator,
means for transferring said first double precision product to another of said registers and said accumulator whereby the low order portion of said first double precision product is stored in said accumulator,
means for generating the second double precision product of a second set of operands during a second multiply cycle,
and means to provide the accumulative product of said first and second sets of operands, said last named means including control means operative during said second multiply cycle of said second set of operands to simultaneously combine the product of said first set of operands with corresponding portions of the product of said second set of operands during each iteration of said second multiply cycle.

4. An accumulative double precision multiplier for providing the accumulative double precision product of a first and second set of operands comprising in combination
a plurality of registers,
an accumulator,
an adder,
said registers, accumulator and adder being of single precision length,
the high order portion being stored in said accumulator and the low order portion in one of said registers, means for transferring said first product into another of said registers and said accumulator whereby the low order portion of said product is stored in said accumulator,
means for entering a first pair of operands into a pair of said registers,
means for sensing the individual digits of one of said operands sequentially starting at the lowest order digit to generate a first double precision product,
means for entering a second pair of operands into said pair of registers,
means responsive to the sequential sensing of the individual digits of one of said second pair of operands for generating a second double precision product during a second multiply cycle, and control means operative during said second multiply cycle of said second set of operands to simultaneously combine the double precision product of said first set of operands with corresponding portions of the double precision product of said second set of operands during each iteration of said second multiply cycle.

5. An accumulative double precision multiplier for accumulating the sum of a plurality of double precision products comprising in combination
a plurality of registers,
an accumulator,
an adder,
said registers, accumulator and adder being of single precision length,
means for entering a first set of operands into a pair of said registers,
means for sensing the individual digits of one of said operands sequentially starting at the lowest order digit to generate a first double precision product during a first multiply cycle,
said means including a shift or a shift and half add operation in accordance with the binary value of said sensed digit,
means interconnecting certain of said registers and said accumulator to form logical storage units of double precision length, said first double precision product being stored in one of said registers and said accumulator, the high order portion of said product being stored in said accumulator,
means for transferring said first double precision product into a combined shifting register-accumulator whereby the low order portion of said product is stored in said accumulator,
means for entering a second set of operands into said pair of said registers,
means responsive to the sensing of the individual digits of one of said second set of operands for generating a second double precision product during a second multiply cycle,
said second product being generated in said accumulator and a shifting register,
and means to provide the accumulative product of said first and second set of operands, said last named means including control means operative during said second multiply cycle of said second set of operands to simultaneously combine the double precision product of said first set of operands with corresponding portions of the double precision product of said second set of operands during each iteration of said second multiply cycle.

6. A multiplier adapted to accumulate the sum of the double precision products of a plurality of sets of operands comprising in combination
means for entering first and second sets of operands into said multiplier,
means responsive to decoding of one of the operands in said first set for generating a first double precision product during a first multiply cycle,
means responsive to the decoding of one of said second set of operands for generating a second double precision product during a second multiply cycle,
and means to provide the accumulative double precision product of said first and second sets of operands, said last named means including control means operative during said second multiply cycle of said second set of operands to simultaneously combine the double precision product of said first set of operands with corresponding portions of the double precision product of said second set of operands during each iteration of said second multiply cycle.

7. An accumulative double precision multiplier comprising in combination
means for generating the double precision product of a first group of operands during a first multiply cycle,
said means including a single precision adder,
an accumulator,
and a shifting register,
means for generating the double precision product of a second group of operands during a second multiply cycle,
said means for generating said double precision products including means for sequentially decoding the digits of one of said operands starting at the lowest order digit,
means responsive to said decoding for generating partial products in accordance with the value of the lowest order digit during each multiply iteration,
and means to provide the accumulative double precision product of said first and second groups of operands, said last named means including control means operative during said second multiply cycle to simultaneously combine the product of said first set of operands with corresponding portions of the product of said second group of operands during each iteration of said second multiply cycle.

8. An accumulative double precision multiplier for accumulating the sum of a plurality of double precision products comprising in combination,
a half adder,
an adder,
an accumulator,
first, second and third registers,
an accumulator storage register,
means for entering a first pair of operands into said second and third registers,
means for sequentially decoding each position of said second register starting at the lowest order digit position,
each said decoding operation initiating a multiply cycle,
each said multiply cycle including a multiply iteration for each digit in said second register,
each iteration comprising a shift operation or a half-add and shift operation in accordance with the binary value of said decoded digit,
means for indicating the termination of said first multiply cycle, the resulting first double precision product being stored in the accumulator-second register combined, the high order portion of said first double precision product being in said accumulator,
means for transferring said first double precision product into the accumulator storage register-accumulator whereby combined the low order portion of said product is stored in said accumulator,
means for entering a second pair of operands into said second and third registers,
means responsive to the decoding of said second register for generating a second sequence of multiply iterations to formulate said second double precision product during a second multiply cycle and
control means operative during said second multiply cycle to simultaneously combine the product of said first set of operands with corresponding portions of said second set of operands during each iteration of said second multiply cycle.

9. A device of the character claimed in claim 8 wherein said half adder is a carry save half adder and said first register functions as a carry register.

10. A device of the character claimed in claim 8 wherein the half add operation in said iterations provides the half-add sum of corresponding digits in said first register, said third register and said accumulator.

11. An accumulative multiplier including an adder and a plurality of registers for deriving the product of a first set of operands during a first multiply cycle, said product being stored in selected ones of said registers, means for repositioning said derived product from said selected registers prior to the second multiply cycle, and means to provide the accumulative product of said first and second sets of operands, said last named means including control means operative during said second multiply cycle to simultaneously combine the product of said first set of operands with corresponding portions of the product of said second set of operands during each iteration of said second multiply cycle.

12. An accumulative multiplier for accumulating a plurality of products according to the formula $a_1b_1+a_2b_2 \ldots$, wherein $a$ and $b$ represent pairs of operands comprising in combination a plurality of registers, an adder, means including said adder and selected ones of said registers for deriving the product $a_1b_1$ during a first multiply cycle, means for repositioning said derived product $a_1b_1$ prior to the second multiply cycle and means to provide the accumulative product of said first and second sets of operands, said last named means including control means operative during said second multiply cycle to simultaneously combine the product of said first set of operands with corresponding portions of the product of said second set of operands during each iteration of said second multiply cycle.

13. A logical configuration for deriving the accumulative sum of a plurality of products, each of said products being derived from an associated set of operands comprising in combination, an adder, a plurality of registers, one of said registers being connected to the output of said adder, means for entering a first set of operands into first and second registers, means including said adder and said connected register for deriving the product of said first set of operands and storing said product in two of said plurality of registers, means for repositioning the contents of said registers representing said product after said first multiply cycle, means for entering a second set of operands into said first and second registers and deriving the product thereof during a second multiply cycle and control means operative during said second multiply cycle of said second set of operands to simultaneously combine the product of said first set of operands with corresponding portions of the product of said second set of operands during each iteration of said second multiply cycle.

14. A device of the character claimed in claim 13 wherein said register connected to the output of said adder functions as an accumulator.

15. A device of the character claimed in claim 14 wherein said accumulator contains the high order portion of the product of said first set of operands upon completion of the multiply cycle and the low order portion of said first product following said repositioning.

References Cited by the Examiner

UNITED STATES PATENTS

| | | | |
|---|---|---|---|
| 3,048,333 | 8/1962 | Brown et al. | 235—164 |
| 3,157,780 | 11/1964 | Carroll | 235—164 |

OTHER REFERENCES

Allen et al., "Double Precision Arithmetic," IBM Technical Disclosure Bulletin, vol. 5, No. 1, June 1962, pps. 36–37.

MALCOLM A. MORRISON, *Primary Examiner.*

M. J. SPIVAK, *Assistant Examiner.*

UNITED STATES PATENT OFFICE
CERTIFICATE OF CORRECTION

Patent No. 3,311,739 March 28, 1967

Lawrence W. Aiken et al.

It is hereby certified that error appears in the above numbered patent requiring correction and that the said Letters Patent should read as corrected below.

Column 13, line 10, for "ermaining" read -- remaining --; line 11, after "multi-" insert -- ply iterations whereby said first double precision --; line 57, after "length," insert -- means interconnecting certain of said registers and said accumulator to form logical storage units of double precision length, --; same column 13, line 58, beginning with "the high order" strike out all to and including "accumulator," in line 63, and insert the same after "precision product," in line 69, same column 13; column 15, line 50, for "whereby combined" read -- combined whereby --.

Signed and sealed this 17th day of December 1968.

(SEAL)

Attest:

Edward M. Fletcher, Jr.
Attesting Officer

EDWARD J. BRENNER
Commissioner of Patents